June 15, 1937.  W. E. STITZER  2,083,966
PIPE SECTION AND COUPLING THEREFOR
Filed April 24, 1937  2 Sheets-Sheet 1
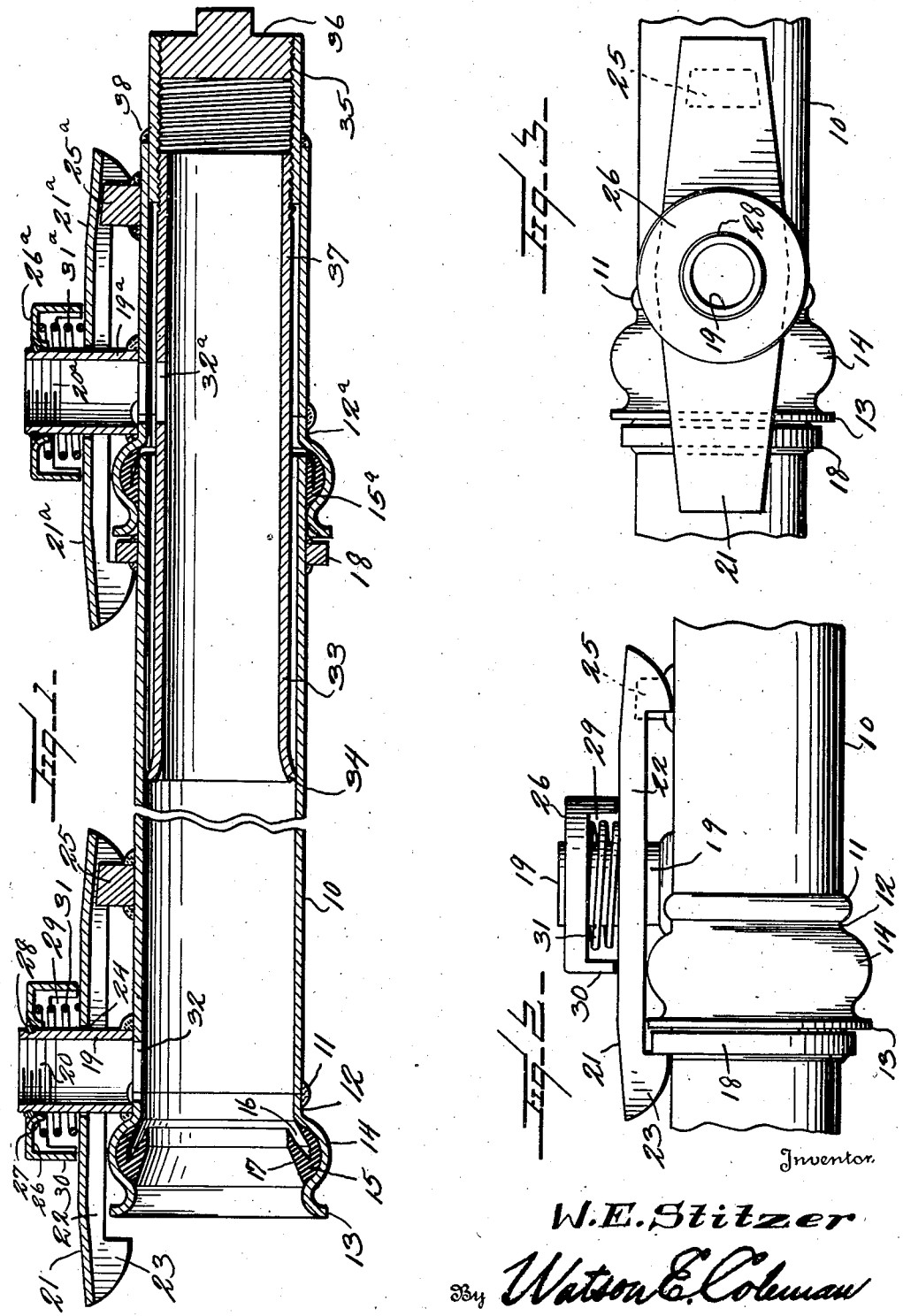
Inventor
W. E. Stitzer
By Watson E. Coleman
Attorney

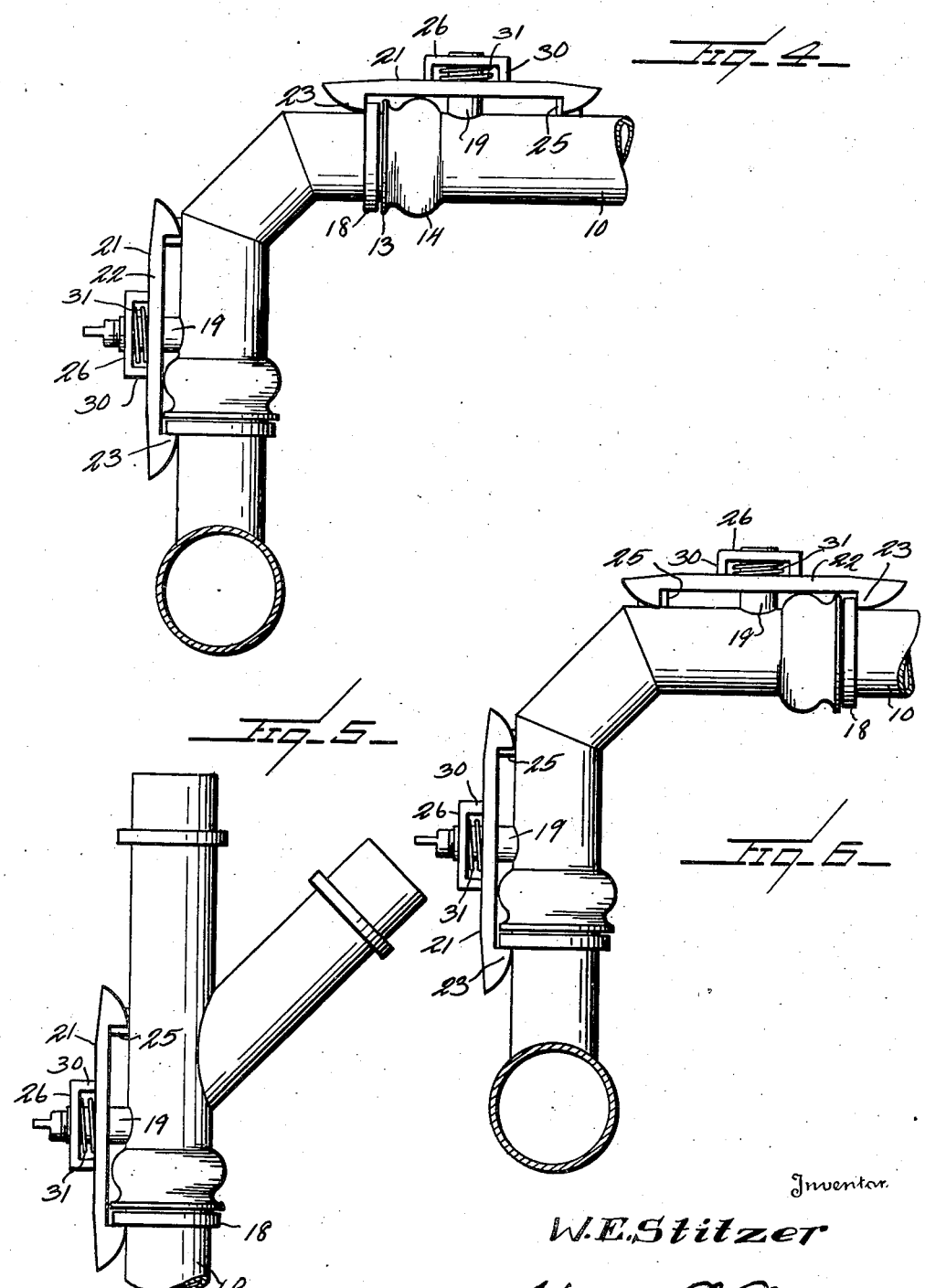

Patented June 15, 1937

2,083,966

UNITED STATES PATENT OFFICE 2,083,966

PIPE SECTION AND COUPLING THEREFOR

William E. Stitzer, Muskogee, Okla.

Application April 24, 1937, Serial No. 138,836

4 Claims. (Cl. 285—169)

This invention relates to pipe lines and particularly to pipe sections having carried thereon and forming part thereof so-called "quick" couplings, these pipe sections being particularly designed for field and irrigation work.

The general object of the invention is to provide pipe sections of this character which are so constructed as to permit quick attachment of the pipe sections or a quick detachment thereof and which secures a water-tight yet flexible connection between the two pipe sections.

Another object is to provide a packing gland in connection with the coupling or joint and provide means for latching the pipe section having said packing gland to an inserted pipe section and provide means for holding the latch closed against any accidental detachment, such means permitting the quick release of the holding means and the quick lifting of the latch to permit the detachment of the pipe section.

A further object is to provide a coupling which permits a certain flexibility between the connected pipe joints or sections and further to provide means whereby a sprinkler head or lateral may be connected through the coupling to the pipe line.

Still another object is to provide means whereby a "dead end" pipe section with a closing plug at one end may be readily connected to a line of pipe or may be readily disconnected therefrom to permit the pipe line to be extended.

Other objects will appear in the course of the following description.

My invention is illustrated in the accompanying drawings wherein:

Figure 1 is a longitudinal sectional view through pipe fittings provided with my improved coupling means.

Figure 2 is an elevation of two sections of pipe coupled with each other by the coupling means.

Figure 3 is a top plan view of the structure shown in Figure 2.

Figures 4, 5 and 6 are elevations showing various pipe structures or arrangements with which the coupling may be used.

Referring particularly to Figures 1 to 3, 10 designates a pipe section, one end of which is welded at 11 to a pipe sleeve or packing gland 12, which is formed at its outer end with an outwardly curved or flaring portion 13, and between this portion 13 and the weld 11, this sleeve is formed with the annular outwardly curved pocket 14. Within this pocket is disposed a cup-rubber 15, the outer face of this cup-rubber fitting within the annular pocket 14 while its inner face is formed with a cleft or chamber 16 whereby water-pressure, when the coupling is in place over an inserted pipe section, will force the lip or wall 17 forming the outer wall of the chamber 16 inward into water-tight engagement with the inserted pipe. The opposite end of the pipe section 10 has welded thereto an annular rib or flange 18, this flange being spaced from the extremity of the pipe section.

Welded or otherwise attached to the pipe section 10 and overlapping and welded to the packing gland 12 is a radially extending element 19 shown as a pipe nipple, the outer end of which is internally screw-threaded at 20. Disposed over this nipple 19 is a latch 21, which is formed of a steel stamping and which is transversely channel-shape, the side walls 22 of this latch at the forward end of the latch having the downwardly extending portions 23 constituting a latch nose. This latch 21 is formed with an intermediately disposed aperture 24 which loosely surrounds the nipple 19. Welded or otherwise attached to the pipe section 10 beneath the rear end of the latch is a lug 25 against which the rear end of the latch normally bears. Surrounding the nipple 19 is a lock washer 26 which is annular in plan and has a central aperture, the material of the washer being curved inward around this aperture, as at 27. Welded or otherwise attached to the nipple is a retaining ring 28 which bears against the outer face of the wall 27, thus permitting the lock washer to be rotated around the nipple but preventing outward movement of the lock washer. The washer 26 is cut away upon its opposite faces at 29 so as to provide two inwardly extending lugs 30. Disposed within the lock washer and between the latch 21 and the outer wall of the lock washer is a coiled compression spring 31 which urges the latch inward. It will be seen that when the lock washer 26 is in the position illustrated in Figures 1 and 2, the latch will be forced inward by the lugs 30 and that the latch cannot be moved outward, but when the lock washer is turned a quarter turn so as to carry the lugs 30 out of their engagement with the outer face of the latch 21, the latch may then be pulled outward against the action of the spring 31.

If another pipe section having a flange such as the flange 18 is inserted within the packing gland, the nose of the latch will engage over the flange of this other pipe section in an obvious manner, latching the two pipe sections to each other. Then if the lock washer be turned to its locking position, as shown in Figure 2, the two pipe sections will be held in coupled engagement with each other. The pressure of liquid within the pipe sections will force the inner wall or lip 17 of the packing inward against the interior pipe section, thus making an absolutely water-tight joint. At the same time, because of the flaring outer end 13 of the gland 12 and because of the fact that the packing 15 is of rubber, there will be a certain amount of flexibility in this joint. One pipe section may be rotated in relation to the other without in any way disengaging the pipe sections.

If it be desired to use this pipe line on irrigation pipe lines, then an aperture 32 may be burned or otherwise formed through the pipe section 10 immediately beneath the nipple 19 and then a second pipe nipple with a spray head or other connections may be readily engaged with the screw-threads 20 of the radial element or nipple 19. Any desired spray head may be used in connection with this device. By this means spray heads or lateral pipes may be readily connected at every joint of the pipe line.

Adapted to be used in connection with a pipe section such as the pipe section 10 is a dead end pipe section shown in Figure 1, including a pipe section 33 which is of sufficiently small diameter to be inserted in the pipe section 10, but which is outwardly flared at 34 at the end inserted within the pipe section 10. The outer end of this female pipe section 33 is screw-threaded for engagement by an iron pipe coupling or collar 35 into which is screwed an ordinary plug 36.

For the purpose of connecting the pipe section 33 to the pipe section 10, there is disposed over the forward end of the collar 35, the rear end or outer end of a sleeve 37 which is welded at 38 to the coupling 35. This sleeve is thus held in spaced relation to the female or pilot pipe 33. Welded to the sleeve 37 is a radially disposed nipple 19ᵃ interiorly threaded, as at 20ᵃ, and disposed over this nipple is the latch 21ᵃ bearing at its rear end against the lug 25ᵃ. Rotatably mounted upon the nipple 19ᵃ is the lock washer 26ᵃ as previously described and enclosing the spring 31ᵃ. All of these parts are precisely as previously described for the end of the pipe 10 and require no further description. The open end of the sleeve 37 is provided with a packing gland 12ᵃ having therein the chambered packing 15ᵃ also as previously described. It will be obvious now that the pilot pipe 33 may be inserted within the pipe 10 until the end of the pipe section 10 is engaged by the packing 15ᵃ and at this time the latch will engage over the annular collar 18 on the pipe section 10 and this dead end pipe section will be thus latched in coupled engagement with the pipe section 10. If it be desired to use this dead end pipe section for irrigation purposes, an aperture 32ᵃ is burned in the pilot pipe 33 and also in the sleeve 37 and, of course, the extremity of the nipple 19ᵃ is engaged with a suitable lateral pipe or spray head.

In Figures 4 to 6, I show a number of different applications of this pipe coupling, but it is not believed necessary to describe these various applications as they are entirely clear. A coupling of the character stated is very flexible, and cannot pull apart, and permits the pipe sections to be instantly assembled or instantly disassembled as desired. No tools are required for assembling or disassembling. It is obvious that the pressure of water will automatically seal the joint or gland against leakage. The joint, however, permits contraction and expansion of the pipe sections.

One of the particular advantages of the construction which has been described and illustrated is that inasmuch as the coupling proper, that is, the glands 14 and 15, is mounted permanently upon the pipe section, whether male or female, no couplings are loose or separate from the pipe sections and, therefore, no couplings are likely to be lost in the field, every item being complete and each joint requiring but one gasket.

It will be noted also that where two pipe sections are connected to each other each provided with the lug 25 and a latch 21 being provided on one of the sections, the sections cannot turn with relation to each other because the lugs will extend up into the latch 21 which is approximately U-shaped in cross-section and engages therefore on each side of the lug 25.

What is claimed is:—

1. A pipe section having at one end a packing gland and packing therein adapted to receive an adjacent pipe section, a radially extending element attached to the pipe section adjacent the packing gland, a latch having its middle apertured for the passage of said radial element, the latch at one end having a nose and this end of the latch projecting beyond the gland, a lock washer rotatably mounted on the element and having opposed inwardly projecting lugs, the lugs, when the washer is in one position, bearing against and holding the latch from outward movement away from the pipe section.

2. A pipe section having at one end a packing gland and packing, a radially extending element attached to the pipe section adjacent the packing gland, a latch having its middle portion apertured for the passage of said element, the latch at one end having a nose, this end of the latch projecting beyond the gland, a lock washer rotatably mounted upon the nipple and having opposed inwardly projecting lugs, the lugs, when the washer is in one position, bearing against and holding the latch from outward movement with relation to the pipe section, and a spring disposed within the washer and bearing against the latch and urging it inward, the washer, when given a quarter turn, permitting the outward movement of the latch against the action of the spring.

3. A pipe section having at one end a packing gland and packing adapted to receive a coacting pipe section, the pipe section at its end remote from the packing gland having an annular flange, a radially extending interiorly screw-threaded nipple attached to the pipe section adjacent the packing gland, a latch having its middle apertured for the passage of said nipple, the latch at one end having a nose and this end projecting beyond the gland, the pipe section beneath the other end of the latch having an outwardly projecting lug against which the latch bears, a lock washer rotatably mounted on the nipple and having inwardly projecting lugs, the lugs, when the washer is rotated into one position, bearing against and holding the latch from outward movement relative to the pipe section, but when given a quarter turn, permitting the outward movement of the latch, and a spring disposed within said lock washer and bearing against the outer face of the latch.

4. A dead end pipe section adapted to be inserted within a coacting pipe section, a collar at one end of the dead end pipe section and carrying a plug, a sleeve attached to the collar and extending over but in spaced relation to the pipe section, the sleeve at its end remote from the collar having a packing gland and packing on its inner face, a radial nipple attached to said sleeve and interiorly screw-threaded at its outer end, a latch having an aperture through which the nipple passes, one end of the latch having a nose, this end projecting beyond the packing gland, a lock washer rotatably mounted upon the nipple and having opposed inwardly projecting lugs, the lugs in one position of the washer bearing against the outer face of the latch and holding it inward and in another position permitting the latch to move outward, and a spring disposed within the lock washer and bearing against the latch and forcing the latch inward.

WILLIAM E. STITZER.